United States Patent
Okumura

(10) Patent No.: US 8,382,403 B2
(45) Date of Patent: Feb. 26, 2013

(54) THROWAWAY DRILL, INSERT OF THROWAWAY DRILL AND CUTTING METHOD USING THE SAME

(75) Inventor: Takashi Okumura, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 1155 days.

(21) Appl. No.: 12/294,884

(22) PCT Filed: Mar. 28, 2007

(86) PCT No.: PCT/JP2007/056601
§ 371 (c)(1),
(2), (4) Date: Sep. 26, 2008

(87) PCT Pub. No.: WO2007/114146
PCT Pub. Date: Oct. 11, 2007

(65) Prior Publication Data
US 2010/0166514 A1    Jul. 1, 2010

(30) Foreign Application Priority Data

Mar. 28, 2006 (JP) ................................. 2006-087282
Mar. 28, 2006 (JP) ................................. 2006-087283

(51) Int. Cl.
*B23B 51/02* (2006.01)

(52) U.S. Cl. ........ 408/223; 408/188; 408/231; 408/713; 407/113

(58) Field of Classification Search ............ 408/187, 408/188, 223, 224, 231, 233, 713; 407/113
See application file for complete search history.

(56) References Cited

U.S. PATENT DOCUMENTS
(Continued)

FOREIGN PATENT DOCUMENTS

| CN | 1162939 A | 10/1997 |
|----|-----------|---------|
| EP | 852979 A1 * | 7/1998 |
| JP | 63124416 U | 8/1988 |
| JP | 09-150304 | 6/1997 |
| JP | 09290310 A * | 11/1997 |

(Continued)

OTHER PUBLICATIONS

Japanese language office action dated May 10, 2011 and its English language translation for corresponding Japanese application 2008508554 cites the foreign patent documents above.

*Primary Examiner* — Daniel Howell
*Assistant Examiner* — Michael Vitale
(74) *Attorney, Agent, or Firm* — DLA Piper LLP (US)

(57) ABSTRACT

A throwaway drill, an insert provided on the throwaway drill, and a cutting method using the same. The throwaway drill has a throwaway drill holder including an inner edge insert pocket having a seat, formed on a central axis side of a tip end of a drill main body, and an outer edge insert pocket having a seat, formed on the outer peripheral side of the tip end; an inner edge insert fixed to the seat of the inner edge insert pocket; and an outer edge insert fixed to the seat of the outer edge insert pocket. When viewed from the tip end side of the drill main body, the inner cutting edge of the inner edge insert includes: a first inner cutting edge provided on the central axis side of the drill main body, being parallel to at least part of the outer cutting edge of the outer edge insert; and a second inner cutting edge provided on the outer peripheral side of the drill main body, being inclined to the seat of the inner edge insert pocket in a direction toward the outer peripheral side, with respect to the first inner cutting edge.

11 Claims, 10 Drawing Sheets

U.S. PATENT DOCUMENTS

| | | | | |
|---|---|---|---|---|
| 4,149,821 A | | 4/1979 | Faber | 408/199 |
| 4,659,264 A | * | 4/1987 | Friedline | 408/204 |
| 4,693,641 A | | 9/1987 | Tsujimura et al. | |
| 4,699,549 A | * | 10/1987 | Shimomura et al. | 407/42 |
| 4,844,669 A | | 7/1989 | Tsujimura et al. | |
| 5,049,011 A | * | 9/1991 | Bohnet et al. | 408/223 |
| 5,800,100 A | | 9/1998 | Krenzer | |
| 5,967,710 A | | 10/1999 | Krenzer | 408/224 |

FOREIGN PATENT DOCUMENTS

| | | | |
|---|---|---|---|
| JP | 10510480 A | | 10/1998 |
| JP | 2000-107920 | | 4/2000 |
| JP | 2001-269808 | | 10/2001 |
| JP | 2002-307221 | | 10/2002 |
| JP | 2003-094222 | | 4/2003 |
| JP | 2004-114188 | | 4/2004 |
| JP | 2007038319 A | * | 2/2007 |

\* cited by examiner (a)

(b)

(a)

(b)

THROWAWAY DRILL, INSERT OF THROWAWAY DRILL AND CUTTING METHOD USING THE SAME

CROSS-REFERENCE TO THE RELATED APPLICATIONS

This application is a national stage of international, application No. PCT/JP2007/056601 filed Mar. 28, 2007, which also claims the benefit of priority under 35 USC 119 to Japanese Patent Application Nos. 2006-087282 and 2006-087283 both filed Mar. 28, 2006, the entire contents of all of which are incorporated herein by reference.

TECHNICAL FIELD

The present invention relates to a throwaway drill and a drill insert for a throwaway drill, as well as a cutting method using the same. More particularly, the present invention relates to a throwaway drill provided with an insert for an inner edge and an insert for an outer edge, and an insert for a throwaway drill usable in either a cutting edge for an inner edge or a cutting edge for an outer edge, as well as a cutting method using the same.

BACKGROUND ART

As examples of drills used in drilling, there are solid-type drills, the entirety of which is integrally formed, and so-called throwaway drills in which a cutting edge for cutting is formed on an insert separated from a drill main body (a holder), and the cutting edge for cutting can be detachably mounted by a screw or the like on the tip end of the holder.

In a generally known throwaway drill, the insert engaged with the tip end of the drill main body is constructed from two types of inserts, namely an insert for an inner edge (hereinafter referred to as an inner edge insert) for cutting about the first half of a hole corresponding to the central area of the hole, and an insert for an outer edge (hereinafter referred to as an outer edge insert) for cutting about the second half of the hole corresponding to the outer peripheral area thereof. In this type of throwaway drill, the outer edge insert and the inner edge insert are arranged opposite each other in a good balance so that the resultant force of radial cutting forces can become substantially zero.

In this type of throwaway drill, there is a tendency of drilling a hole smaller than the drill diameter inherent to this drill in the occurrence of a cutting force to deflect the drill main body radially inward. In this case, when the action of cutting force is discontinued at the termination of machining, the deflection of the drill main body is recovered. Therefore, when the drill is lifted from the hole, the outer edge insert might injure the machined wall surface. It is therefore important that the resultant force of the cutting forces of the outer edge insert and the inner edge insert should be zero, or alternatively the drill main body is deflected radially outward by controlling the resultant force so as to exert radially outward.

For example, Patent Document No. 1 discloses a throwaway drill in which an inner edge insert and an outer edge insert are arranged so that the supporting surface of the outer edge insert has an inclination with respect to the supporting surface of the inner edge insert, as viewed from the tip end side of the drill main body. The throwaway drill thus arranged enables the cutting force generated radially inward to be controlled to substantially zero.

FIG. 10 is a diagram showing the arrangement of an inner edge insert and an outer edge insert when a throwaway drill of related art as described in Patent Document No. 1 is viewed from the tip end side thereof. As shown in FIG. 10, the throwaway drill 100 has an inner edge insert pocket 103 formed on a central axis 102 side at the tip end of a drill main body 101, and an outer edge insert pocket 104 formed on the outer peripheral side of the above-mentioned tip end. The throwaway drill 100 is further provided with an inner edge insert 105 fixed to a seat 103a of the inner edge insert pocket 103, and with an outer edge insert 106 fixed to a seat 104a of the outer edge insert pocket 104. The cutting force generated radially inward is controlled to substantially zero by arranging so that the seat 104a has an inclination with respect to the seat 103a.

However, it remains difficult for the throwaway drill 100 having the above construction to achieve a cutting force balance between the inner edge insert 105 and the outer edge insert 106 in a specific machining process such as offset machining.

Meanwhile, as a drilling using a throwaway drill, a so-called offset machining is generally performed in which the throwaway drill is attached to a lathe, and the work center and the tool center are offset for machining a hole larger than the drill diameter inherent to the drill.

However, when the offset machining is performed by using the above-mentioned throwaway drill 100, there remains the problem that the center height of an inner cutting edge 105a of the inner edge insert 105 is lowered and therefore the uncut remainder (the core) of the central part of the bottom worked becomes too large. That is, as shown in FIG. 10, with the throwaway drill 100 having the above-mentioned construction, the space between a line L passing through the offset center 110 and being parallel to the inner cutting edge 105a, and the inner cutting edge 105a, namely a core lowering amount D in offset is increased. Correspondingly, the center height of the inner cutting edge 105a is lowered. As a result, there arises the problem that the uncut remainder (the core) of the central part of the bottom worked becomes too large.

Heretofore, it has been unsuccessful in obtaining a throwaway drill that can prevent the core from becoming too large during offset machining, while achieving a balance between the cutting force exerted on the inner edge insert and the cutting force exerted on the outer edge insert.

On the other hand, the throwaway drill has been used as a drill to perform drilling, as described above, in which the outer edge insert on the outer diameter side and the inner edge insert on the inner diameter side are detachably provided on the tip end of the drill main body so that their respective rotation loci cross with each other.

The cutting edges of the inserts used in the throwaway drill are exhausted whenever they are used for hole machining. Therefore, some attempts have been conventionally made to use an insert a plurality of times by forming a plurality of cutting edges on the insert and then replacing one cutting edge with another every time the cutting edge is exhausted. This enables cost reduction per cutting edge. For example, in Patent Document No. 2, two outer cutting edges and two inner cutting edges are formed on an insert, and constructed so that two locations thereof can be used as the outer cutting edges and thereafter other two locations can be used as the inner cutting edges, thereby making it possible to use a total of these four locations.

Meanwhile, the cutting edges are required to have the following performances. Specifically, the outer cutting edge is required to have a low cutting resistance, and the inner cutting edge is required to have cutting edge strength to endure pushing action, namely fracture resistance. For example, Patent Document No. 3 discloses that a broad range region covering a corner R cutting edge of an inner edge insert which is located on the center of the drill main body, and an outer cutting edge region and an inner cutting edge region which are connected to the corner R cutting edge, are configured to have a rake angle of 0° or a negative value. Patent Document No. 3 also discloses that this configuration improves the cutting edge strength at the corner portions, leading to improvement in cutting edge strength.

However, in the insert for a throwaway drill of Patent Document No. 3, even if exhibited sufficient cutting edge strength as the inner cutting edge, when used as the outer cutting edge, the rake angle of the corner R cutting edge on the outer cutting edge is small and hence the cutting resistance of the outer cutting edge becomes large, causing the drill main body to be deflected. Hence, there remains the problem that the desired working diameter cannot be obtained or the hole is bent. Heretofore, any insert for a throwaway drill exhibiting sufficient performances in both the inner edge insert and the outer edge insert is not yet disclosed. That is, when the throwaway drill is constructed by an insert commonly used in both the inner cutting edge and the outer cutting edge, it is necessary to satisfy compatibility between the cutting edge strength of the inner cutting edge and the cutting resistance reduction of the outer cutting edge.

Patent Document No. 1: Japanese Unexamined Patent Publication No. 53-64888

Patent Document No. 2: Japanese Unexamined Patent Publication No. 9-150304

Patent Document No. 3: Japanese Unexamined Patent Publication No. 2002-307221

DISCLOSURE OF THE INVENTION

Problems to be Solved by the Invention

An advantage of the invention is to provide a throwaway drill capable of achieving a cutting force balance between the inner edge insert and the outer edge insert, and an insert for a throwaway drill as well as a cutting method using the same.

Means for Solving the Problems

The throwaway drill according to one embodiment of the invention includes a throwaway drill holder, an inner edge insert and an outer edge insert. The throwaway drill holder is provided with an inner edge insert pocket which has a seat and is formed on a central axis side of a tip end of a drill main body, and with an outer edge insert pocket which has a seat and is formed on the outer peripheral side of the tip end. The inner edge insert has an inner cutting edge and is fixed to the seat of the inner edge insert pocket. The outer edge insert has an outer cutting edge and is fixed to the seat of the outer edge insert pocket. When viewed from the tip end side of the drill main body, the inner cutting edge of the inner edge insert includes a first inner cutting edge and a second inner cutting edge. The first inner cutting edge is provided on the central axis side of the drill main body and is parallel to at least part of the outer cutting edge of the outer edge insert. The second inner cutting edge is provided on the outer peripheral side of the drill main body and is inclined to the seat of the inner edge insert pocket in a direction toward the outer peripheral side, with respect to the first inner cutting edge.

Preferably, the inclination angle of the second inner cutting edge with respect to the first inner cutting edge is 5 to 15°.

Preferably, the length of the first inner cutting edge is 5 to 20% of the length of a drill diameter.

In order to enable control of cutting force so as to generate further radially outward, when viewed from the tip end side of the drill main body, the outer cutting edge of the outer edge insert preferably includes a first outer cutting edge and a second outer cutting edge. The first outer cutting edge is provided on the outer peripheral side of the drill main body and is parallel to the first inner cutting edge. The second outer cutting edge is provided on the central axis side of the drill main body and is inclined to the seat of the outer edge insert pocket with respect to the first outer cutting edge.

Preferably, the inclination angle of the second outer cutting edge with respect to the first outer cutting edge is 5 to 15°.

The insert for the throwaway drill according to a first embodiment of the invention has a main body including a lower surface, an upper surface and a side surface. The insert has a supporting surface formed on the lower surface of the main body, and a cutting edge formed at a crossed portion between the upper surface and the side surface of the main body. The cutting edge has an inner cutting edge and an outer cutting edge which are continuous with each other and form a corner portion of the upper surface. The inner cutting edge has a first inner cutting edge located on the corner portion side and formed linear, and a second inner cutting edge located oppositely to the corner portion with respect to the first inner cutting edge. The second inner cutting edge is inclined to the supporting surface in a direction away from the corner portion, with respect to the first inner cutting edge. The outer cutting edge has a first outer cutting edge located on the corner portion side and is parallel to the first inner cutting edge.

Preferably, the outer cutting edge has a second outer cutting edge located oppositely to the corner portion with respect to the first outer cutting edge, and the second outer cutting edge is inclined to the supporting surface in a direction away from the corner portion, with respect to the first outer cutting edge.

The throwaway drill according to other embodiment of the invention includes a throwaway drill holder, which has an inner edge insert pocket formed on the central axis side of the tip end of a drill main body and an outer edge insert pocket formed on the outer peripheral side of the tip end; the above-mentioned insert for the throwaway drill provided on the inner edge insert pocket in which at least part of the inner cutting edge projects from the tip end of the drill main body; and the above-mentioned insert for the throwaway drill provided on the outer edge insert pocket in which at least part of the outer cutting edge projects from the tip end of the drill main body. When viewed from the tip end side of the drill main body, the first inner cutting edge and the first outer cutting edge are preferably arranged in parallel with each other.

The insert for the throwaway drill according to other embodiment of the invention has a main body including an upper surface and a side surface. The insert has a rake face formed on the upper surface of the main body and a cutting edge formed at a crossed portion between the upper surface and the side surface of the main body. The cutting edge has a corner R cutting edge formed at a corner portion of the rake face, an inner cutting edge located on one end side of the corner R cutting edge and an outer cutting edge located on the other end side of the corner R cutting edge. The inner cutting edge has a first inner cutting edge located on the corner R cutting edge side. The rake angle of a rake face connected to the first inner cutting edge is positive. The rake angle of the rake face connected to the corner R cutting edge is increased in the direction from the first inner cutting edge to the outer cutting edge.

Preferably, the rake angle of the rake face connected to the first inner cutting edge is 1 to 5°.

Preferably, the inner cutting edge further has a second inner cutting edge located oppositely to the corner R cutting edge with respect to the first inner cutting edge, and the rake angle of the rake face connected to the first inner cutting edge is smaller than the rake angle of the rake face connected to the second inner cutting edge.

Preferably, the rake angle of the rake face connected to the second inner cutting edge is 5 to 15°.

Preferably, the inner cutting edge further has a third inner cutting edge located between the first inner cutting edge and the second inner cutting edge, and the rake angle of a rake face connected to the third inner cutting edge is increased in the direction from the first inner cutting edge to the second inner cutting edge.

Preferably, the length of the third inner cutting edge is 5 to 15% of the length of the inner cutting edge.

Preferably, the value calculated from the following equation, $\beta-\alpha$, is 5° or more, where $\alpha$ is the rake angle of a rake face connected to a boundary between the first inner cutting edge and the corner R cutting edge, and $\beta$ is the rake angle of a rake face connected to a boundary between the outer cutting edge and the corner R cutting edge.

The throwaway drill according to still other embodiment of the invention includes: a throwaway drill holder, which has an inner edge insert pocket formed on a central axis side of the tip end of a drill main body and an outer edge insert pocket formed on the outer peripheral side of the tip end; the above-mentioned insert for the throwaway drill provided on the inner edge insert pocket in which at least part of the inner cutting edge projects from the tip end of the drill main body; and the above-mentioned insert for the throwaway drill provided on the outer edge insert pocket in which at least part of the outer cutting edge projects from the tip end of the drill main body.

Preferably, the axial rake of the seat of the outer edge insert pocket exhibits a positive value.

The method of cutting a work material according to an embodiment of the invention includes the steps of: bringing the inner cutting edge and the outer cutting edge near the work material by rotating at least one of the throwaway drill and the work material; cutting the work material by bringing the inner cutting edge and the outer cutting edge into contact with the surface of the work material; and keeping the inner cutting edge and the outer cutting edge away from the work material.

Effect of the Invention

In the throwaway drill of the first embodiment, when viewed from the tip end side of the drill main body, the inner cutting edge of the inner edge insert includes the first inner cutting edge, which is arranged on the central axis side of the drill main body and parallel to at least part of the outer cutting edge of the outer edge insert, and the second inner cutting edge, which is arranged on the outer peripheral side of the drill main body and inclined to the seat of the inner edge insert pocket in a direction toward the outer peripheral side, with respect to the first inner cutting edge. Accordingly, the resultant force of cutting forces exerted radially can become substantially zero, or the above-mentioned resultant force can be generated radially outward. It is therefore possible to reduce the deflection of the drill main body radially inward due to cutting force imbalance between the inner edge insert and the outer edge insert.

Even when performing offset machining on a lathe, the center height of the inner cutting edge remains unchanged, reducing the core. In addition to the inner edge insert, the outer edge insert includes the first outer cutting edge located on the outer peripheral side of the drill main body and parallel to the first inner cutting edge, and the second outer cutting edge located on the central axis side of the drill main body and inclined to the seat of the outer edge insert pocket with respect to the first outer cutting edge. This enables control of cutting force so as to generate further radially outward. The throwaway drill of the embodiment eliminates the need to form any special inclination angle between the supporting surface of the inner edge insert and the supporting surface of the outer edge insert, and the above-mentioned effect can be produced even when these two supporting surfaces are parallel to each other.

In the insert for the throwaway drill of the second embodiment, the inner cutting edge has the first inner cutting edge located on the corner R cutting edge side, and the rake angle of a rake face connected to the first inner cutting edge, and the rake angle of the rake face connected to the corner R cutting edge is increased in the direction from the first inner cutting edge to the outer cutting edge. Therefore, this insert exhibits excellent cutting edge strength when used as the inner edge insert, and sufficiently reduces cutting resistance when used as the outer edge insert. Further, the mounting of this insert as the inner edge insert and as the outer edge insert achieves a cutting force balance between the inner edge insert and the outer edge insert.

Additionally, the seat of the outer edge insert pocket in the drill main body of the throwaway drill is inclined so that the axial rake can have a positive value. Therefore, the substantial rake angle of the outer cutting edge can be increased to reduce the cutting resistance caused by the outer cutting edge, while retaining the improved strength of the portion of the inner cutting edge for cutting the vicinity of the drill central axis.

The method of cutting a work material of the embodiment is capable of cutting the work material while keeping the cutting force balance between the inner edge insert and the outer edge insert, thus ensuring an excellent finished surface even under more severe cutting conditions such as deep hole machining.

BRIEF DESCRIPTION OF THE DRAWINGS

FIG. 3 (b) is a partially enlarged views showing the vicinity of the outer edge insert of the throwaway drill shown in FIG. 3;

PREFERRED EMBODIMENTS FOR CARRYING OUT THE INVENTION

<Throwaway Drill and Insert for Throwaway Drill>

Preferred embodiments of throwaway drills and inserts for throwaway drills according to the invention will be described in detail with reference to the accompanying drawings.

First Preferred Embodiment

Figure 1:
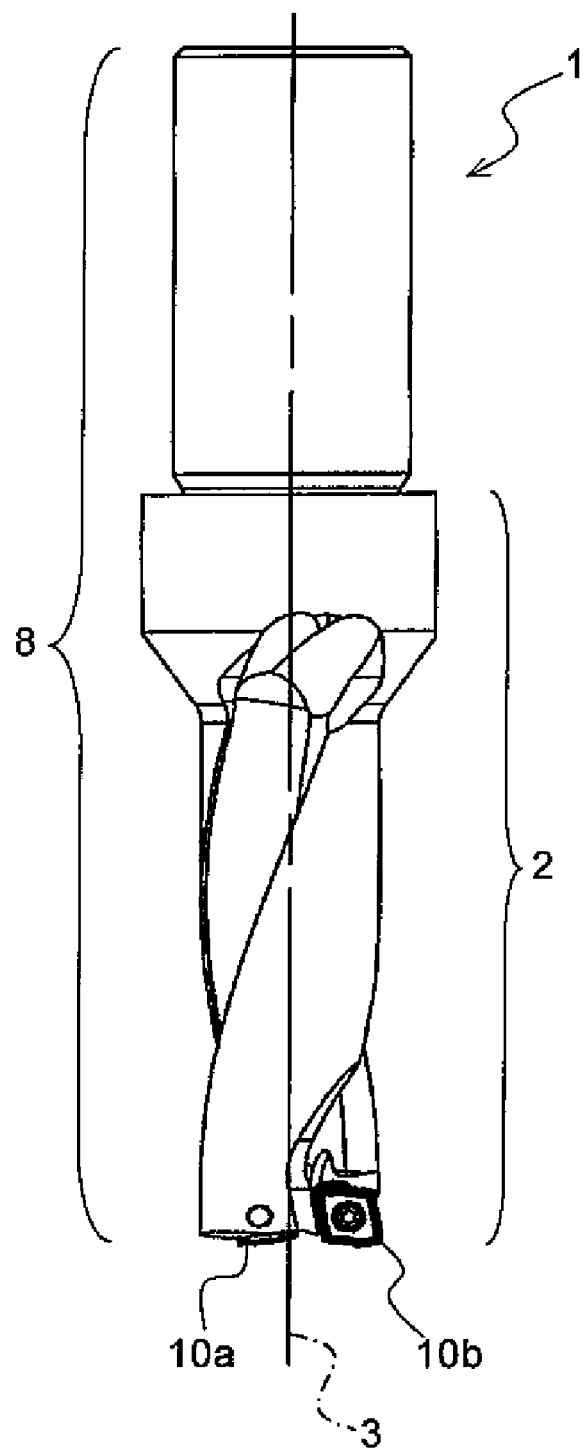
FIG. 1 is a front view showing a throwaway drill according to a first preferred embodiment of the invention.
Figure 2:
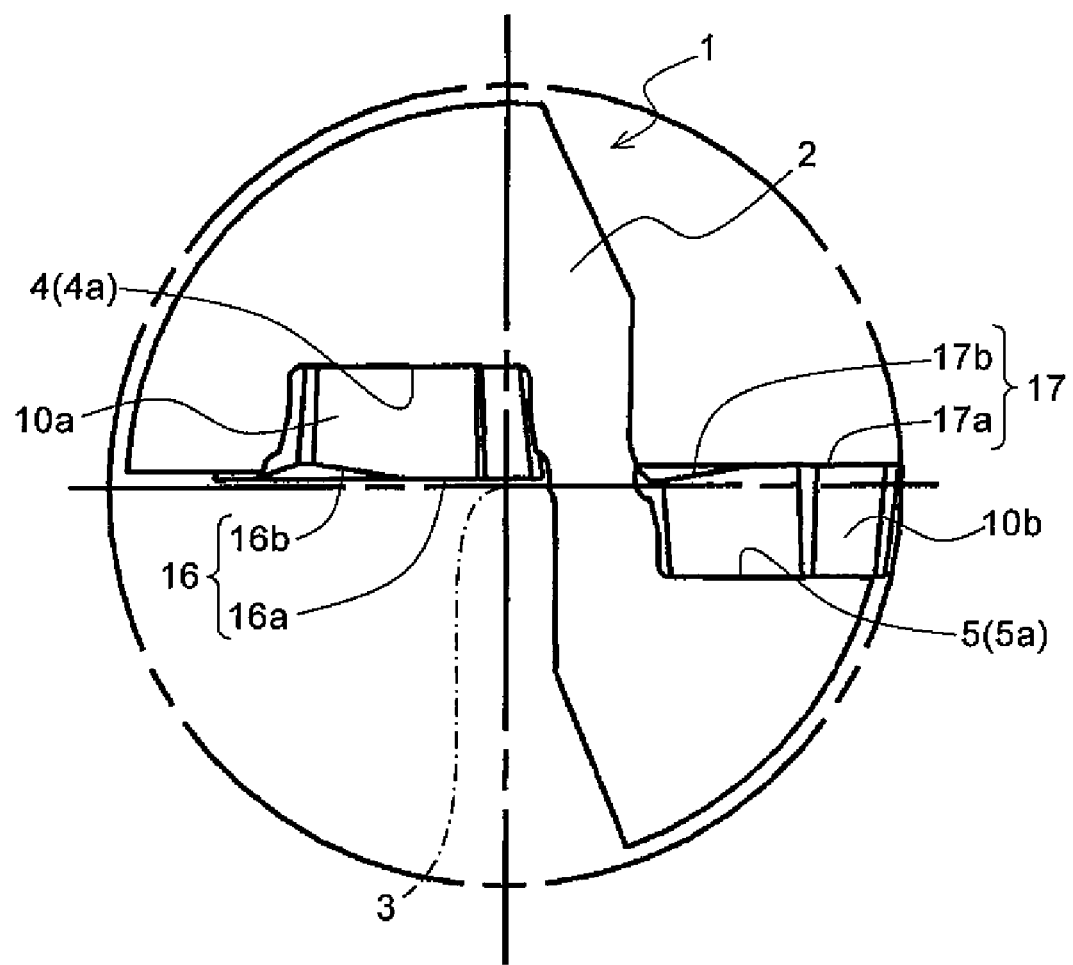
FIG. 2 is a diagram showing the arrangement of an inner edge insert and an outer edge insert when the throwaway drill in the first preferred embodiment is viewed from the tip end side thereof.

FIG. 1 is a front view showing a throwaway drill according to a first preferred embodiment of the invention. FIG. 2 is a diagram showing the arrangement of an inner edge insert and an outer edge insert when the throwaway drill in the first preferred embodiment is viewed from the tip end side thereof. FIG. 3(a) is a partially enlarged view showing the vicinity of the inner edge insert of the throwaway drill shown in FIG. 2, and FIG. 3(b) is a partially enlarged view showing the vicinity of the outer edge insert of the throwaway drill shown in FIG. 2. FIGS. 4(a) and 4(b) are a perspective view and a plan view of the insert for the throwaway drill of the first preferred embodiment, respectively.

Figure 3:
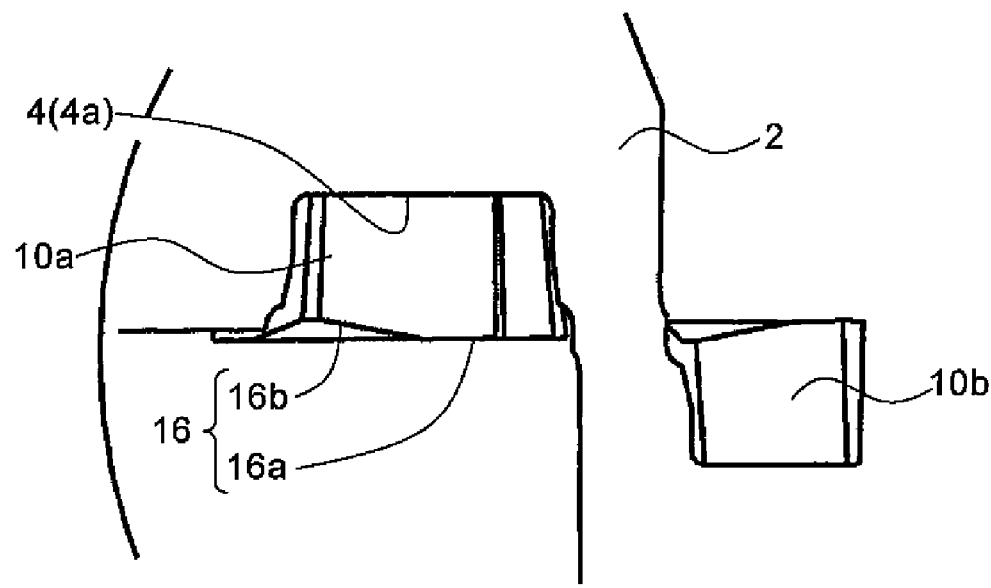
FIG. 3 (a) is a partially enlarged view showing the vicinity of the inner edge insert of the throwaway drill shown in FIG. 2.
Figure 3:
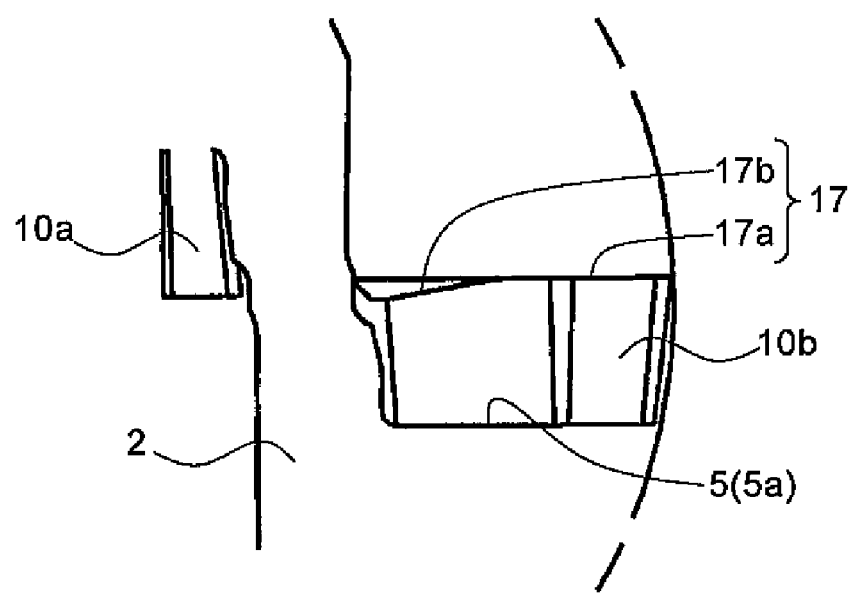
Figure 4:
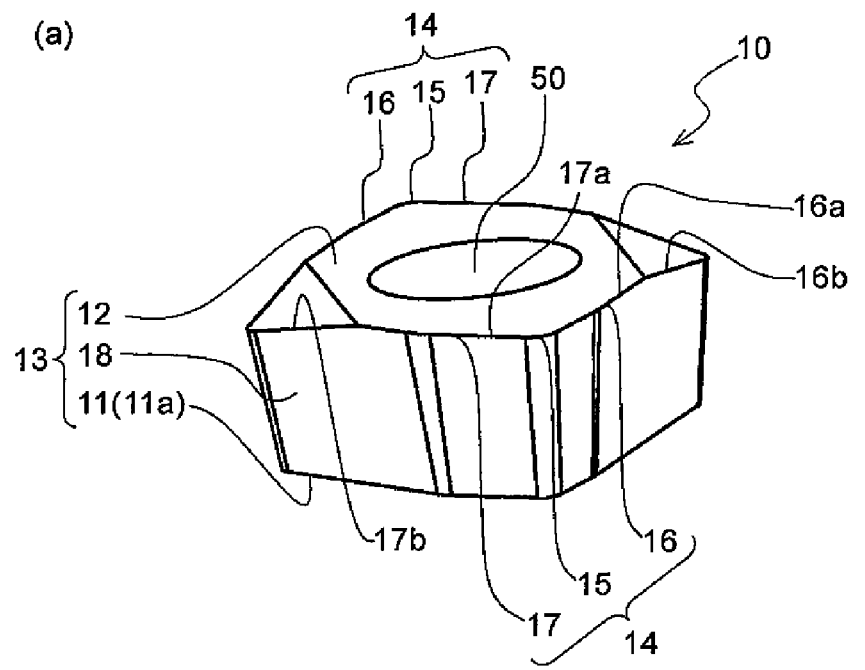
FIGS. 4(a) and 4(b) are a perspective view and a plan view of the insert for the throwaway drill of the first preferred embodiment, respectively.
Figure 4:
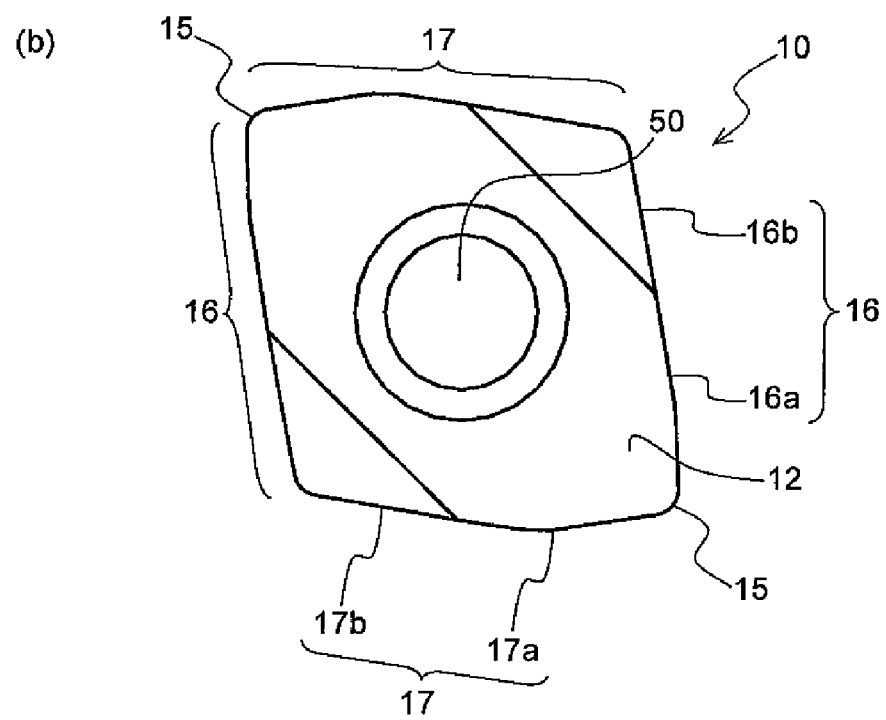

As shown in FIGS. 1 to 3, a throwaway drill 1 of the present preferred embodiment includes a throwaway drill holder 8 provided with an inner edge insert pocket 4 which has a seat 4a and is formed on the side of a central axis 3 at the tip end of a bar-shaped drill main body 2, and with an outer edge insert pocket 5 which has a seat 5a and is formed on the outer peripheral side of the above-mentioned tip end. The terms "the seats 4a and 5a" mean the locations of the inner edge insert pocket 4 and the outer edge insert pocket 5 as being insert mounting parts, which are brought into contact with a supporting surface 11a of a later-described cutting insert 10.

On the other hand, as shown in FIGS. 4(a) and 4(b), an insert 10 for a throwaway drill of the present preferred embodiment (hereinafter referred to as a cutting insert 10) has a main body 13 provided with a lower surface 11, an upper surface 12 and a side surface 18. The cutting insert 10 has a supporting surface 11a formed on the lower surface 11 and a cutting edge 14 formed at the crossed portion between the upper surface 12 and the side surface 18. The cutting edge 14 has an inner cutting edge 16 and an outer cutting edge 17 which are continuous with each other and form corner portion 15 of the upper surface 12.

The corner portion 15 may be provided with a corner R cutting edge for improving cutting strength. That is, the inner cutting edge 16 and the outer cutting edge 17 may be continuous with the corner R cutting edge located at the corner portion 15.

The inner cutting edge 16 is a cutting edge for the inner edge, specifically for using the cutting insert 10 as an inner edge insert. The inner cutting edge 16 has a first inner cutting edge 16a located on the corner portion 15 side and formed linear, and a second inner cutting edge 16b, which is located oppositely to the corner portion 15 with respect to the first inner cutting edge 16a, and which is inclined to the supporting surface 11a in a direction away from the corner portion 16, with respect to the first inner cutting edge 16a.

The outer cutting edge 17 is a cutting edge for an outer edge, specifically for using the cutting insert 10 as an outer edge insert. The outer cutting edge 17 has a first outer cutting edge 17a located on the corner portion 15 side and parallel to the first inner cutting edge 16a. Preferably, the outer cutting edge 17 also has a second outer cutting edge 17b, which is located oppositely to the corner portion 15 with respect to the first outer cutting edge 17a, and which is inclined to the supporting surface 11a in a direction away from the corner portion 15, with respect to the first outer cutting edge 17a.

The expression that "the first inner cutting edge 16a is parallel to the first outer cutting edge 17a" means that the former and the latter may be substantially parallel to each other. Depending on the size of the cutting insert 10, an error of approximately 0 to 2° may occur. Even in this case, the same effect can be produced.

The above-mentioned cutting insert 10 has a plate shape, and the upper surface 12 of the cutting insert 10 has a polygon shape. Examples of the polygon shape include a square shape and a pentagon shape. A through hole 50 is formed in a central portion of the upper surface 12. The through hole 50 is a screw hole for fixing the cutting insert 10 to the drill main body 2. The cutting insert 10 has a 180-degree rotationally symmetrical shape with respect to the central axis of the through hole 50. This is economical because, when one cutting edge in use is worn, the other cutting edge not yet used can be used by causing rotation through 180° of the insert 10.

The throwaway drill 1 is provided with two cutting inserts 10 described above. That is, as shown in FIG. 2, one of these two cutting inserts 10 is used as the inner edge insert 10a and the other is used as the outer edge insert 10b, and are fixed to the seat 4a of the inner edge insert pocket 4 and the seat 5a of the outer edge insert pocket 5, respectively, which are the insert mounting parts of the single drill main body 2. The inner edge insert 10a and the outer edge insert 10b are mounted with the upper surface 12 of the cutting insert 10 oriented in the cutting direction.

More specifically, the inner edge insert 10a is mounted in the inner edge insert pocket 4 with at least part of the inner cutting edge 16 projecting from the tip end of the drill main body 2 (refer to FIG. 1). Similarly, the outer edge insert 10b is mounted in the outer edge insert pocket 5 with at least part of the outer cutting edge 17 projecting from the tip end of the drill main body 2. Preferably, the first inner cutting edge 16a and the first outer cutting edge 16b are arranged parallel to each other when the drill main body 2 is viewed from the tip end side thereof. Specifically, the expression "when the drill main body 2 is viewed from the tip end side thereof" corresponds to "when the drill main body 2 is viewed from the tip end side thereof along with the central axis thereof."

Here, the inner cutting edge 16 of the inner edge insert 10a includes a first cutting edge ridge and a second cutting edge ridge. That is, when the drill main body 2 is viewed from the tip end side thereof, the inner cutting edge 16 of the inner edge insert 10a includes a first inner cutting edge 16a (the first cutting edge ridge), which is arranged on the central axis 3 side of the drill main body 2 and parallel to at least part of the outer cutting edge 17 of the outer edge insert 10b, and a second inner cutting edge 16b (the second cutting edge ridge), which is arranged on the outer peripheral side of the drill main body 2 and inclined to the seat 4a of the inner edge insert pocket 4 in a direction toward the outer peripheral side, with respect to the first inner cutting edge 16a. This enables the force to deflect the drill main body 2 radially outward to be exerted on the inner edge insert 10a. Consequently, the resultant force of the cutting forces exerted radially of the inner edge insert 10a and the outer edge insert 10b can become substantially zero, or the above-mentioned resultant force can be generated radially outward. It is therefore possible to reduce the deflection of the drill main body 2 radially inward due to cutting force imbalance between the inner edge insert 10a and the outer edge insert 10b.

Hence, when the inner cutting edge 16 includes the first inner cutting edge 16a and the second cutting edge 16b thus constructed, it is capable of achieving a cutting force balance between the inner edge insert and the outer edge insert, and reducing a core during offset machining.

When the cutting edge ridge of the outer edge insert 10b (i.e. the outer cutting edge 17) is formed by a single cutting edge, the first inner cutting edge 16a becomes parallel to the entire cutting edge of the outer edge insert 10b. On the other hand, when the outer edge insert 10b includes a plurality of cutting edges as will be described later, the first inner cutting edge 16a may be parallel to any one of these cutting edges of the outer edge insert 10b. In this case, the first inner cutting edge 16a is preferably parallel to the cutting edge of the outer edge insert 10b located on the outer peripheral side of the drill main body 2.

The second inner cutting edge 16b is arranged on the outer peripheral side of the drill main body 2 and inclined to the seat 4a with respect to the first inner cutting edge 16a, as described above. Specifically, the second inner cutting edge 16b is inclined to the seat 4a at a predetermined inclination angle in a direction toward the outer peripheral direction of the drill main body 2. Preferably, the inclination angle of the second inner cutting edge 16b with respect to the first inner cutting edge 16a is 5 to 15°.

Preferably, the length of the first inner cutting edge 16a is 5 to 20% with respect to the length of the drill diameter. The length of the first inner cutting edge 16a falling within such a predetermined range ensures the above-mentioned effect. The term "the drill diameter" means a cutting diameter when the offset value is zero. Specifically, it corresponds to twice the distance from the central axis of the drill main body to the outer peripheral side end of the first outer cutting edge 17a.

Alternatively, other cutting edge may be arranged between the first inner cutting edge 16a and the second inner cutting edge 16b. For example, the first and second inner cutting edges 16a and 16b may be continuous with each other by a curve line or a straight line.

The outer cutting edge 17 of the outer edge insert 10b may be constructed of either a single cutting edge or a plurality of cutting edges as viewed from the tip end side of the drill. Preferably, the outer cutting edge 17 is constructed of a plurality of cutting edges in order to enable control of the cutting force so as to generate further radially outward.

When the outer cutting edge 17 of the outer edge insert 10b is constructed from a plurality of cutting edge ridges, the outer edge insert 10b preferably has a third cutting edge ridge and a fourth cutting edge ridge. That is, when the drill main body 2 is viewed from the tip end side thereof, the outer cutting edge 17 of the outer edge insert 10b preferably has the first outer cutting edge 17a (the third cutting edge ridge) arranged on the outer peripheral side of the drill main body 2 and parallel to the first inner cutting edge 16a, and a second outer cutting edge 17b (the fourth cutting edge ridge) arranged on the central axis 3 side of the drill main body 2 and inclined to the seat 5a of the outer edge insert pocket 5 with respect to the first outer cutting edge 17a. Like the inner edge insert 10a, the outer edge insert 10b having the second outer cutting edge 17b as an inclined cutting edge is capable of controlling cutting force radially outward.

Specifically, the second outer cutting edge 17b is inclined to the seat 5a at a predetermined inclination angle in the direction from the first outer cutting edge 17a side to the central axis 3 of the drill main body 2. Preferably, the inclination angle of the second outer cutting edge 17b with respect to the first outer cutting edge 17a is 5 to 15°. Alternatively, like the above-mentioned first inner cutting edge 16a and the second inner cutting edge 16b, other cutting edge may be arranged between the first outer cutting edge 17a and the second outer cutting edge 17b. For example, the first and second outer cutting edges 17a and 17b may be continuous with each other by a curve line or a straight line.

The foregoing throwaway drill 1 is suitably used for offset machining on a lathe. In the offset machining on the lathe, a flat cut surface formed on the shank of the drill main body 2 becomes a reference, and the line of intersection between "the flat cut surface" and "the vertical cross-section of the central axis of the drill" becomes an offset direction. The offset direction is set parallel to the first inner cutting edge 16a of the inner cutting edge 16. Therefore, even when the central axis 3 of the drill is shifted by the offset, the center height of the inner cutting edge 16 remains unchanged and hence the core does not become too large. This enables high-accuracy finished-surface machining even during offset machining.

Second Preferred Embodiment

Figure 5:
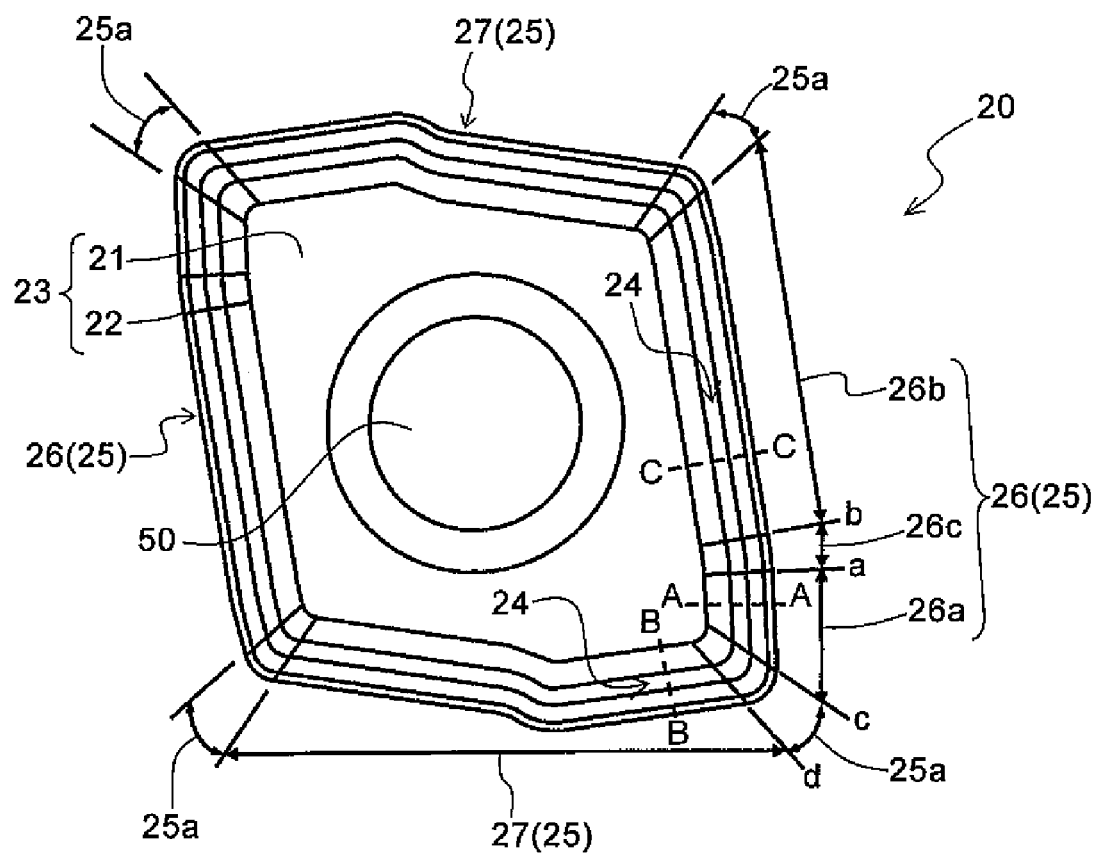
FIG. 5 is an enlarged plan view of an insert for a throwaway drill according to a second preferred embodiment of the invention.
Figure 6:
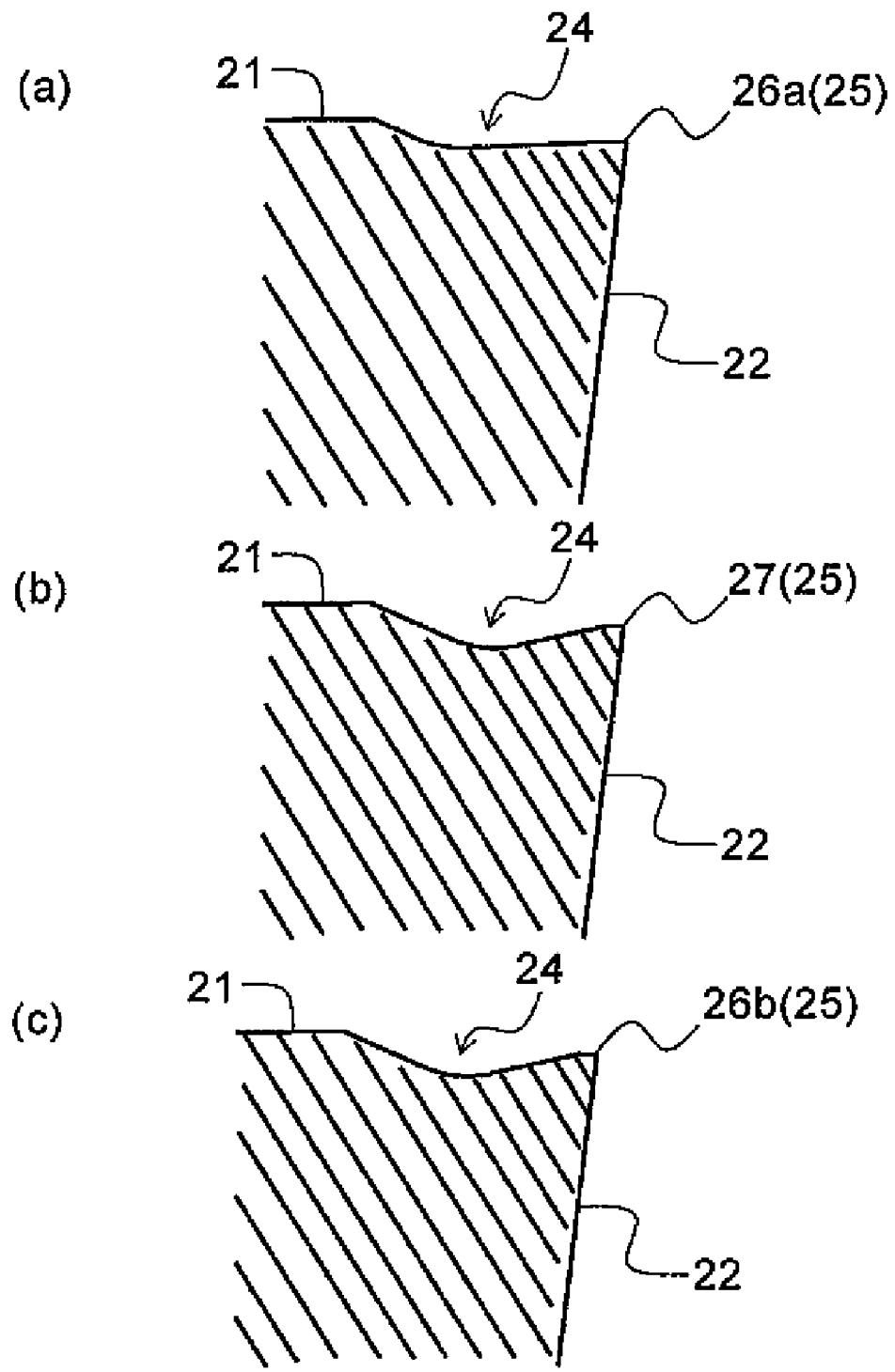
FIG. 6(a) is a cross-sectional view taken along the line A-A in FIG. 5.
FIG. 6(b) is a cross-sectional view taken along the line B-B in FIG. 5.
FIG. 6(c) is a cross-sectional view taken along the line C-C in FIG. 5.
Figure 7:
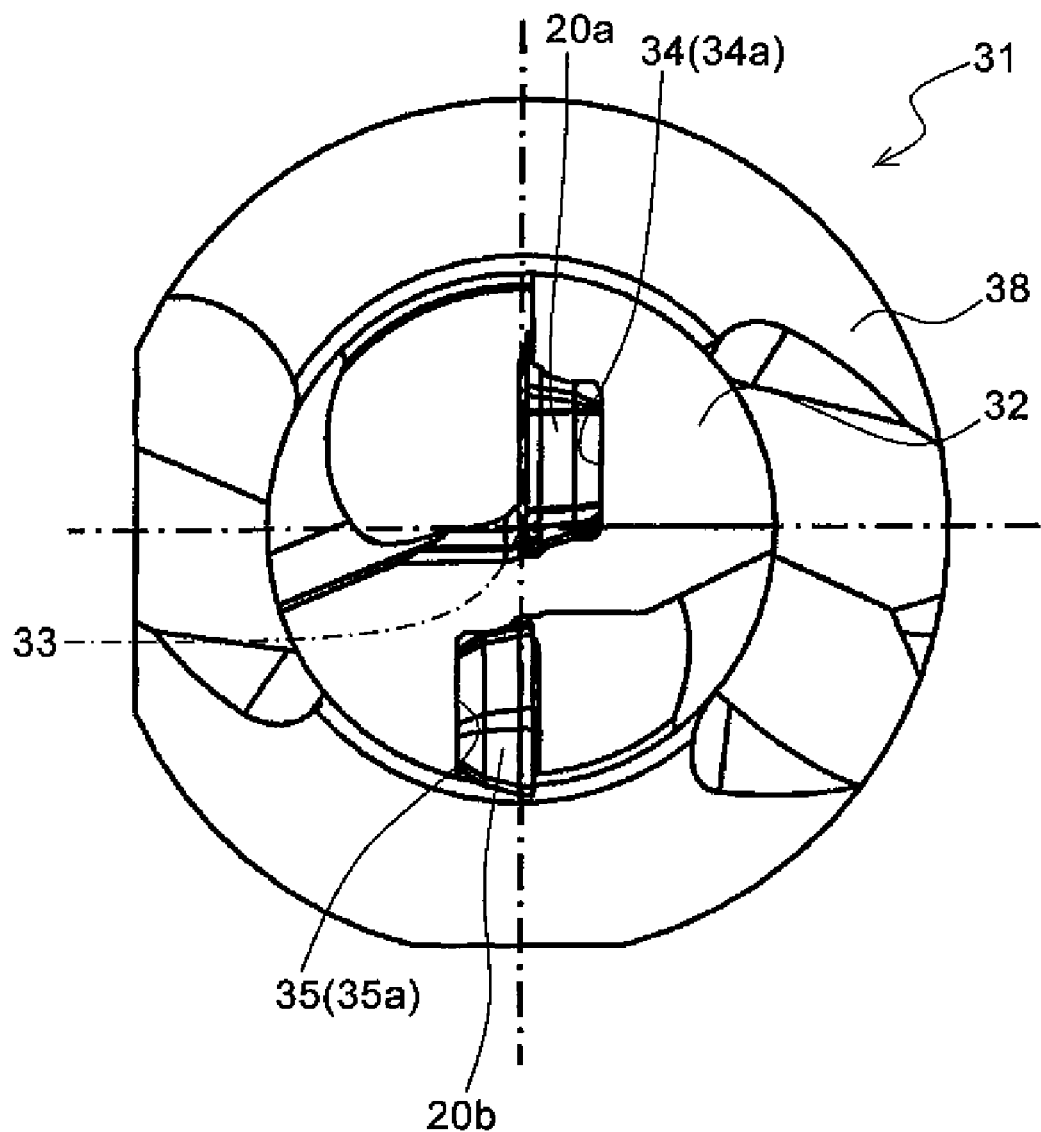
FIG. 7 is a diagram showing the arrangement of an inner edge insert and an outer edge insert when the throwaway drill of the second preferred embodiment is viewed from the tip end side thereof.
Figure 8:
FIG. 8 is a partially enlarged side view showing the vicinity of the outer edge insert pocket in the second preferred embodiment.
Figure 9:
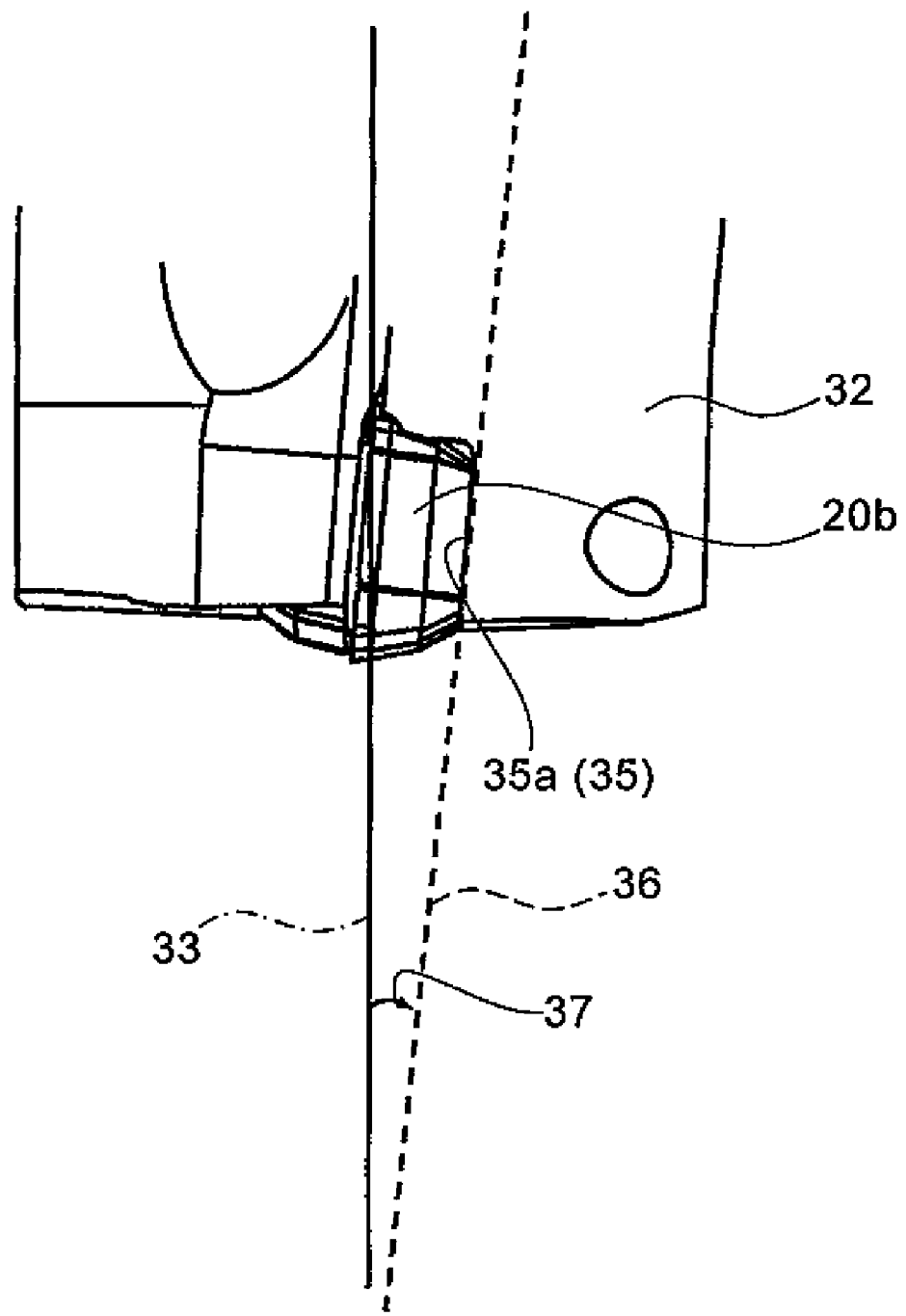
FIG. 9 is a partially enlarged schematic explanatory drawing showing the axial rake of the seat of the outer edge insert pocket in the second preferred embodiment.
Figure 10:
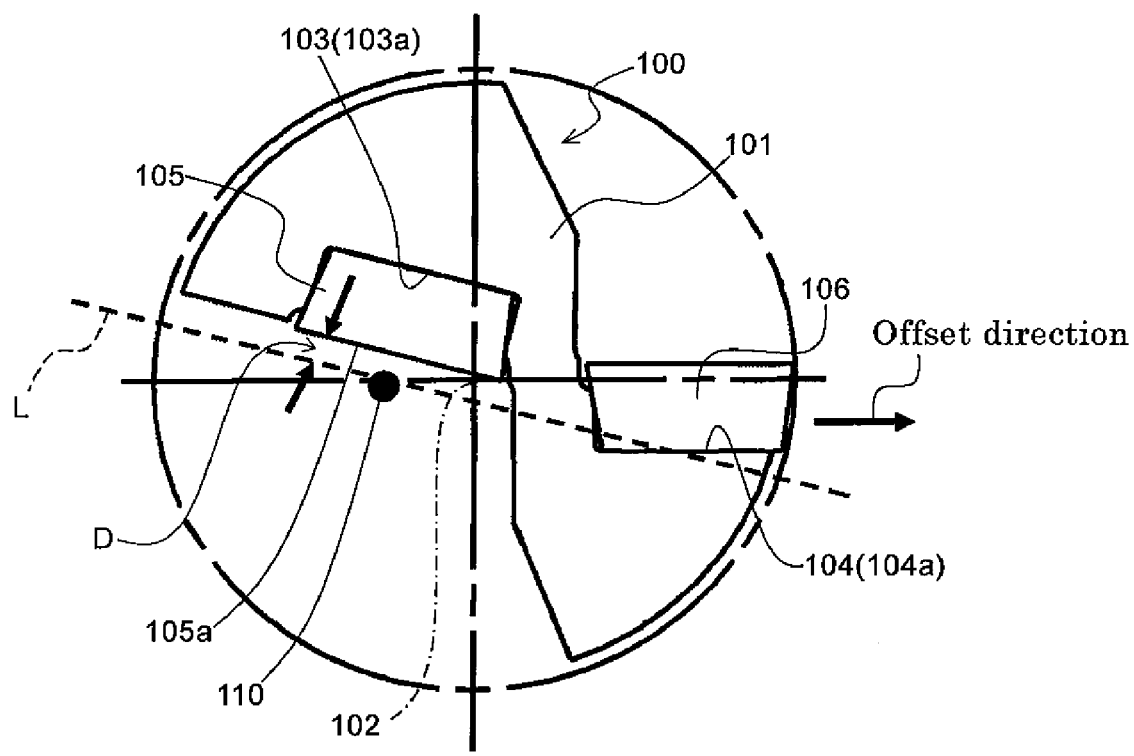
FIG. 10 is a diagram showing the arrangement of an inner edge insert and an outer edge insert when a throwaway drill of related art is viewed from the tip end side thereof.

A throwaway drill and an insert for a throwaway drill according to a second preferred embodiment will be described in detail with reference to the accompanying drawings. FIG. 5 is an enlarged plan view of an insert for a throwaway drill according to the second preferred embodiment. FIG. 6(a) is a cross-sectional view taken along the line A-A in FIG. 5. FIG. 6(b) is a cross-sectional view taken along the line B-B in FIG. 5. FIG. 6(c) is a cross-sectional view taken along the line C-C in FIG. 5. FIG. 7 is a diagram showing the arrangement of an inner edge insert and an outer edge insert when the throwaway drill in the second preferred embodiment is viewed from the tip end side thereof. FIG. 8 is a partially enlarged side view showing the vicinity of the outer edge insert pocket in the second preferred embodiment. FIG. 9 is a partially enlarged schematic explanatory drawing showing the axial rake of the seat of the outer edge insert pocket in the second preferred embodiment. In FIGS. 5 to 9, the same references have been used as in FIGS. 1 to 4 for similar parts, and the corresponding descriptions are omitted here.

Like the cutting insert 10 of the first preferred embodiment, the insert for the throwaway drill according to the second preferred embodiment is used in the throwaway drill. When viewed from the tip end side of a drill main body, the insert as an inner edge insert on the central axis side of the drill main body, and the insert as an outer edge insert on the outer peripheral side of the drill main body are fixed to their respective seats on the tip end side of the drill main body.

Specifically, as shown in FIGS. 5 and 6, the insert for the throwaway drill 20 of the second preferred embodiment (hereinafter referred to as the cutting insert 20) has a plate shape, and an upper surface 21 of the insert 20 has a polygon shape. The cutting insert 20 has a main body 23 including the upper surface 21 and a side surface 22, a rake face (a breaker groove) 24 formed on the upper surface 21, and a cutting edge 25 formed at the crossed portion between the upper surface 21 and the side surface 22.

Corner R cutting edges 25a are formed at individual corner portions of the upper surface 21, namely the corner portions of the rake face 24. The term "the corner R cutting edges 25a" means curved cutting edges formed at the individual corner portions of the upper surface 21. These corner R cutting edges 25a are connected to both a later-described inner cutting edge 26 that is required to have high cutting edge strength, and a later-described outer cutting edge 27 that is required to have low cutting resistance, and therefore both performances are required.

The cutting edge 25 has the above-mentioned corner R cutting edges 25a, inner cutting edges 26 located on one ends of the corner R cutting edges 25a, and outer cutting edges 27 located on the other ends of the corner R cutting edges 25a. The inner cutting edges 26 are cutting edges for an inner edge, specifically for using the cutting insert 20 as an inner edge insert. The outer cutting edges 27 are cutting edges for an outer edge, specifically for using the cutting insert 20 as an outer edge insert.

The inner cutting edge 26 is constructed from a plurality of cutting edge regions as described below. When the cutting insert 20 is provided on the drill main body as an inner edge insert, the inner cutting edge 26 has a first cutting edge for an inner edge (a first inner cutting edge) 26a located on the central axis side of the drill main body. The first inner cutting edge 26a is located on the corner R cutting edge 25a side and the closest to the central axis of the drill main body among a plurality of cutting edges included in the inner cutting edge 26, when the drill main body is viewed from the tip end side thereof.

The first inner cutting edge 26a is configured that the rake angle of the rake face 24 connected thereto is positive, and the rake angle of the rake face 24 connected to the corner R cutting edge 25a is increased in the direction from the first inner cutting edge 26a side to the outer cutting edge 27 side. Owing to this configuration, the cutting insert 20 can exhibit excellent cutting edge strength when used as the inner edge insert, and also sufficiently reduce cutting resistance when used as the outer edge insert. In addition, by mounting the cutting insert 20 as the inner edge insert and the outer edge insert, it is possible to achieve a cutting force balance between the inner edge insert and the outer edge insert.

The rake angle of the rake face 24 connected to the first inner cutting edge 26a is 1 to 5°, preferably 2 to 4°. When used as the outer cutting edge, the rake angle of 1° or more minimizes the cutting resistance of the outer cutting edge on the outer peripheral side of the drill main body, thereby reducing deflection of the drill main body. This reduces the tendency that the desired machining diameter cannot be obtained or the hole is bent. When used as the inner cutting edge, the rake angle of 5° or less provides sufficient cutting edge strength.

The first inner cutting edge 26a may have a constant rake angle within the above-mentioned range, or alternatively the rake angle may be increased in a direction away from the drill center. The rake angle of the first inner cutting edge 26a may be measured based on, for example, FIG. 6(a) showing the cross-section taken along the line A-A in FIG. 5.

When the cutting insert 20 is mounted as an inner edge insert on the drill main body, the inner cutting edge 26 preferably has a second inner cutting edge for an inner edge (a second inner cutting edge) 26b having a larger rake angle than the first inner cutting edge 26a, on the outer peripheral side of the drill main body. That is, it is preferable that the inner cutting edge 26 further have the second inner cutting edge 26b located oppositely to the corner R cutting edge 25a with respect to the first inner cutting edge 26a, and the rake angle of the rake face 24 connected to the first inner cutting edge 26a be smaller than the rake angle of the rake face 24 connected to the second inner cutting edge 26b. Owing to this configuration, the individual cutting edges located on the outer peripheral side and the central axis side in the inner cutting edge 26 can exhibit cutting performance suitable for their respective locations. This further enhances the above-mentioned effect. The second inner cutting edge 26b is the closest to the outer periphery of the drill main body among the plurality of cutting edges included in the inner cutting edge 26, when viewed from the tip end side of the drill main body.

The rake angle of the rake face 24 connected to the second inner cutting edge 26b may be set to a predetermined value depending on the type of material constituting a work material, such as steel, aluminum or low carbon steel. Particularly when cutting the work material made of steel, the rake angle of the rake face 24 connected to the second inner cutting edge 26b is 5 to 15°, preferably 8 to 12°. The rake angle of 5° or more reduces cutting resistance, reducing deflection of the holder. The rake angle of 15° or less reduces accidental fracture due to insufficient cutting edge strength.

The second inner cutting edge 26b may have a constant rake angle within the above-mentioned range, or alternatively the rake angle may be increased toward the outer cutting edge 27. The rake angle of the second inner cutting edge 26b may be measured based on, for example, FIG. 6(c) showing the cross-section taken along the line C-C in FIG. 5.

Preferably, the inner cutting edge 26 has a third cutting edge for an inner edge (a third inner cutting edge) 26c located between the first inner cutting edge 26a and the second inner cutting edge 26b. The rake angle of the rake face 24 connected to the third inner cutting edge 26c is preferably increased in the direction from the first inner cutting edge 26a side to the second inner cutting edge 26b. This satisfies a rake angle to achieve excellent cutting performance in the second inner cutting edge 26b that is required to have cutting force not less than a certain value.

The length of the third inner cutting edge 26c is preferably 5 to 15% of the total cutting edge length of the inner cutting edge 26 (namely the total of the cutting edge lengths of the first inner cutting edge 26a, the second inner cutting edge 26b and the third inner cutting edge 26c). When the length of the third inner cutting edge 26c is 5% or more, it is possible to suppress chip clogging due to a sharp change of rake angle in the third inner cutting edge 26c. When the above-mentioned length of the third inner cutting edge is 15% or less, it is possible to reduce the increase in cutting resistance.

Preferably, a boundary a between the first inner cutting edge 26a and the third inner cutting edge 26c, and a boundary b between the second inner cutting edge 26b and the third cutting edge 26c are connected to each other by a smooth curved line.

The outer cutting edge 27 is adjacent to the inner cutting edge 26 with the corner R cutting edge 25a in between, as shown in FIG. 5. Specifically, one end of the corner R cutting edge 25a is connected to the outer cutting edge 27, and the other end is connected to the inner cutting edge 26. The rake angle of the rake face 24 connected to the outer cutting edge 27 needs to be greater than the rake angle of the first inner cutting edge 26a. Although no particular limitation is imposed on the rake angle of the outer cutting edge 27, it is preferably between 5 and 25° in accordance with the type of a work material. For example, when cutting the work material made of steel, the rake angle of the outer cutting edge 27 is preferably 10 to 20°. The rake angle of the outer cutting edge 27 may be measured based on, for example, FIG. 6(b) showing the cross-section taken along the line B-B in FIG. 5.

As described above, in the cutting insert 20, the rake angle of the corner R cutting edge 25a located between the first inner cutting edge 26a and the outer cutting edge 27 keeps increasing in the direction from the first inner cutting edge 26a to the outer cutting edge 27. It is particularly preferable that the first inner cutting edge 26a has a rake angle as small as 1 to 5°, and the rake angle keeps increasing from the first inner cutting edge 26a to the outer cutting edge 27. This provides sufficient cutting strength on the first inner cutting edge 26a side of the corner R cutting edge 25a, and also achieves a sufficient reduction in the cutting resistance of the outer cutting edge 27 side having antinomy relation with the above cutting strength.

The value calculated from the following equation, $\beta-\alpha$, is preferably 5° or more, where $\alpha$ is the rake angle of the rake face 24 connected to a boundary c between the first inner cutting edge 26a and the corner R cutting edge 25a, and $\beta$ is the rake angle of the rake face 24 connected to a boundary d between the outer cutting edge 27 and the corner R cutting edge 25a. When the above-mentioned value is 5° or more, it is possible to fully satisfy compatibility between the cutting edge strength of the inner cutting edge used as the inner edge insert and the reduction of the cutting resistance of the outer cutting edge used as the outer edge insert.

Like the throwaway drill 1 according to the first preferred embodiment, the throwaway drill of the second preferred embodiment is provided with two cutting inserts 20 described above. That is, as shown in FIG. 7, a throwaway drill 31 according to the second preferred embodiment is provided with a throwaway drill holder 38 having an inner edge insert pocket 34, which has a seat 34a and is formed on the central axis 33 side of the tip end of the drill main body 32, and an outer edge insert pocket 35, which has a seat 35a and is formed on the outer peripheral side of the above-mentioned tip end. The seat 34a is the seat (the central seat) to fix the inner edge insert, and the seat 35a is the seat (the outer peripheral seat) to fix the outer edge insert.

One of these two cutting inserts 20 is used as an inner edge insert 20a and the other is used as an outer edge insert 20b. These two cutting inserts 20 are fixed to the seat 34a of the inner edge insert pocket 34 and the seat 35a of the outer edge insert pocket 35 of the single drill main body 32, respectively. The inner edge insert and the outer edge insert are mounted with the upper surfaces 21 of these cutting inserts 20 oriented in the cutting direction. More specifically, the inner edge insert 20a is provided on the inner edge insert pocket 34 with at least part of the inner cutting edge 26 projecting from the tip end of the drill main body 32. The outer edge insert 20b is provided on the outer edge insert pocket 25 with at least part of the outer cutting edge 27 projecting from the tip end of the drill main body 32.

Preferably, the axial rake of the outer peripheral seat, namely the seat 35a of the outer edge insert pocket 35 exhibits a positive value. Specifically, as shown in FIGS. 8 and 9, the seat 35a to fix the outer edge insert 20b is inclined clockwise from the central axis 33 of the drill main body 32. More specifically, the seat 35a is inclined clockwise from the central axis 33 so that an axial rake 37 formed between the central axis 33 and an extension 36 extending from the seat 35a exhibits a positive value.

With the seat 35a thus inclined so that the axial rake 37 exhibits a positive value, it is possible to increase the substantial rake angle of the outer cutting edge 27 to be formed when the cutting insert 20 is provided on the seat 35a. Even if the rake angle of the corner R cutting edge 25a becomes small by decreasing the rake angle of the first inner cutting edge 26a, the substantial rake angle of the outer cutting edge 27 can be increased by mounting it on the seat 35a. Hence, the cutting resistance of the outer cutting edge 27 can be further reduced without deteriorating the fracture resistance of the first inner cutting edge 26a. It is therefore suitable for use in machining susceptible to vibration due to chatter such as deep hole machining. Thus, the adjustment to the axial rake 37 of the seat 35a enables to satisfy compatibility between the effect of improving the strength of the inner cutting edge 26 and the effect of reducing the cutting resistance of the outer cutting edge 27. In particular, the axial rake 37 is preferably 3 to 8°.

The second preferred embodiment is otherwise similar to the throwaway drill 1 and the cutting insert 10 described in the foregoing preferred embodiment, and the corresponding descriptions are omitted here.

<Method of Cutting Work Material>

A preferred embodiment of the method of cutting a work material according to the invention will be described below. The method of cutting a work material in the present embodiment is a method of cutting a work material by using the throwaway drill 1 in the first preferred embodiment, and includes the following steps.

That is, the method includes: the step of bringing the inner cutting edge 16 and the outer cutting edge 17 near the work material by rotating at least one of the throwaway drill 1 and a work material; the step of cutting the work material by bringing the inner cutting edge 16 and the outer cutting edge 17 into contact with the surface of the work material; and the step of keeping the inner cutting edge 16 and the outer cutting edge 17 away from the work material.

As described earlier, in the throwaway drill 1, when the drill main body 2 is viewed from the tip end side thereof, the inner cutting edge 16 of the inner edge insert 10a includes the first inner cutting edge 16a, which is arranged on the central axis 3 side of the drill main body 2 and parallel to at least part of the outer cutting edge 17 of the outer edge insert 10b, and a second inner cutting edge 16b, which is arranged on the outer peripheral side of the drill main body 2 and inclined to the seat 4a of the inner edge insert pocket 4 in a direction toward the outer peripheral side with respect to the first inner cutting edge 16a. This enables to achieve a cutting force balance between the inner edge insert 10a and the outer edge insert 10b, making it possible to achieve a cutting force balance between the inner edge insert and the outer edge insert and to reduce the deflection of the drill main body 2 radially inward. Hence, an excellent finished surface is attainable under more severe cutting conditions, and the core can be reduced even when performing offset machining.

Instead of the throwaway drill 1 according to the first preferred embodiment, the throwaway drill 31 according to the second preferred embodiment can be used to achieve a cutting force balance between the inner edge insert 20a and the outer edge insert 20b, reducing the deflection of the drill main body 32 radially inward. Accordingly, an excellent finished surface is attainable under more severe cutting conditions.

Particularly when the throwaway drill 31 is used, the inner edge insert 20a has excellent cutting edge strength and the cutting resistance of the outer edge insert 20b can be reduced sufficiently. This is therefore suitable for use in machining susceptible to vibration due to chatter such as deep hole machining.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. For example, the invention is not to be considered to be limited by the throwaway drills and the inserts for the throwaway drills according to the foregoing first and second preferred embodiments, respectively. A throwaway drill and an insert for a throwaway drill according to other preferred embodiment attained by combining these first and second preferred embodiments.

The invention claimed is:

1. A throwaway drill comprising:
a throwaway drill holder having an inner edge insert pocket formed on the central axis side of a tip end of a drill main body and an outer edge insert pocket formed on the outer peripheral side of the tip end; and a first insert for the throwaway drill provided on the inner edge insert pocket in which at least part of the inner cutting edge projects from the tip end of the drill main body, the first insert for the throwaway drill comprising,
a main body including a lower surface, an upper surface and a side surface, the insert having a supporting surface formed on the lower surface of the main body and a cutting edge formed at a crossed portion between the upper surface and the side surface of the main body,
the cutting edge having an inner cutting edge and an outer cutting edge being continuous with each other and forming a corner portion of the upper surface,
the inner cutting edge having a first inner cutting edge located on the corner portion side and formed linear, and a second inner cutting edge located oppositely to the corner portion with respect to the first inner cutting edge, the second inner cutting edge being inclined with respect to the first inner cutting edge and being closer to the supporting surface as being farther from the corner portion, and
the outer cutting edge having a first outer cutting edge located on the corner portion side and being parallel to the first inner cutting edge; and
a second insert for the throwaway drill provided on the outer edge insert pocket in which at least part of the outer cutting edge projects from the tip end of the drill main body, the second insert for the throwaway drill comprising,
a main body including a lower surface, an upper surface and a side surface, the insert having a supporting surface formed on the lower surface of the main body and a cutting edge formed at a crossed portion between the upper surface and the side surface of the main body,
the cutting edge having an inner cutting edge and an outer cutting edge being continuous with each other and forming a corner portion of the upper surface,
the inner cutting edge having a first inner cutting edge located on the corner portion side and formed linear, and a second inner cutting edge located oppositely to the corner portion with respect to the first inner cutting edge, the second inner cutting edge being inclined with respect to the first inner cutting edge and being closer to the supporting surface as being farther from the corner portion, and
the outer cutting edge having a first outer cutting edge located on the corner portion side and being parallel to the first inner cutting edge;
wherein when viewed from the tip end side of the drill main body, the first inner cutting edge of the first insert and the first outer cutting edge of the second insert are arranged in parallel with each other.

2. The insert for the throwaway drill according to claim 1, wherein the outer cutting edge has a second outer cutting edge located oppositely to the corner portion with respect to the first outer cutting edge, the second outer cutting edge being inclined with respect to the first outer cutting edge and being closer to the supporting surface as being farther from the corner portion.

3. An insert for a throwaway drill having a main body including an upper surface and a side surface, the insert having a rake face formed on the upper surface of the main body and a cutting edge formed at a crossed portion between the upper surface and the side surface of the main body, wherein
the cutting edge has a corner R cutting edge formed at a corner portion of the rake face, an inner cutting edge located on one end side of the corner R cutting edge and an outer cutting edge located on the other end side of the corner R cutting edge,
the inner cutting edge has a first inner cutting edge located on the corner R cutting edge side, and a second inner cutting edge located oppositely to the corner R cutting edge with respect to the first inner cutting edge,
a rake angle of the rake face connected to the first inner cutting edge is positive and is smaller than a rake angle of the rake face connected to the second inner cutting edge, and
a rake angle of the rake face connected to the corner R cutting edge is larger at the outer cutting edge side than the first inner cutting edge side.

4. The insert for the throwaway drill according to claim 3, wherein the rake angle of the rake face connected to the first inner cutting edge is 1 to 5°.

5. The insert for the throwaway drill according to claim 3, wherein the rake angle of the rake face connected to the second inner cutting edge is 5 to 15°.

6. The insert for the throwaway drill according to claim 3, wherein the inner cutting edge further has a third inner cutting edge located between the first inner cutting edge and the second inner cutting edge, and the rake angle of the rake face connected to the second inner cutting edge is larger at the second inner cutting edge side than at the first inner cutting edge side.

7. The insert for the throwaway drill according to claim 6, wherein the length of the third inner cutting edge is 5 to 15% of the length of the inner cutting edge.

8. The insert for the throwaway drill according to claim 3, wherein the value calculated from the following equation, $\beta - \alpha$, is 5° or more, where $\alpha$ is the rake angle of the rake face connected to a boundary between the first inner cutting edge and the corner R cutting edge, and $\beta$ is the rake angle of the rake face connected to a boundary between the outer cutting edge and the corner R cutting edge.

9. A throwaway drill comprising:
a throwaway drill holder having an inner edge insert pocket formed on a central axis side of a tip end of a drill main body and an outer edge insert pocket formed on the outer peripheral side of the tip end;
a first insert for the throwaway drill according to claim 3 provided on the inner edge insert pocket in which at least part of the inner cutting edge projects from the tip end of the drill main body; and
a second insert for the throwaway drill according to claim 3 provided on the outer edge insert pocket in which at least part of the outer cutting edge projects from the tip end of the drill main body.

10. The throwaway drill according to claim 9, wherein the axial rake of the seat of the outer edge insert pocket exhibits a positive value.

11. A method of cutting a work material comprising:
bringing the inner cutting edge and the outer cutting edge near the work material by rotating at least one of the throwaway drill according to claim 1 or 9 and the work material;
cutting the work material by bringing the inner cutting edge and the outer cutting edge into contact with the surface of the work material; and
keeping the inner cutting edge and the outer cutting edge away from the work material.

* * * * *